United States Patent
Yang

(10) Patent No.: US 6,369,475 B1
(45) Date of Patent: Apr. 9, 2002

(54) MOTOR HAVING CLOSED MAGNETIZATION CIRCUIT FORMED BY THE CASING WHICH HOLDS THE ROTATING SHAFT OF THE MOTOR

(76) Inventor: Tai-Her Yang, No. 32, Lane 29, Taipin Street, Si-Hu Town, Dzan-Hwa (TW)

( * ) Notice: Subject to any disclaimer, the term of this patent is extended or adjusted under 35 U.S.C. 154(b) by 0 days.

(21) Appl. No.: 08/499,367

(22) Filed: Jul. 7, 1995

Related U.S. Application Data

(63) Continuation of application No. 08/189,755, filed on Feb. 1, 1994, now abandoned.

(51) Int. Cl.$^7$ .............................. H02K 5/04; H02K 1/12
(52) U.S. Cl. .......................... 310/89; 310/254; 310/258
(58) Field of Search ........................... 310/258, 89, 263, 310/254, 179, 216, 218

(56) References Cited

U.S. PATENT DOCUMENTS

| | | | | |
|---|---|---|---|---|
| 338,910 A | * | 3/1886 | Ball ............................ | 310/254 |
| 366,941 A | * | 7/1887 | Easton ........................ | 310/254 |
| 1,047,821 A | * | 12/1912 | MacFarlane et al. ......... | 310/254 |
| 1,414,612 A | * | 5/1922 | Aufiero ....................... | 310/218 |
| 1,720,208 A | * | 7/1929 | Collins ........................ | 310/258 |
| 1,822,859 A | * | 9/1931 | Perkins ....................... | 310/258 |
| 1,978,484 A | * | 10/1934 | Aufiero ....................... | 310/218 |
| 2,064,090 A | * | 12/1936 | Sullivan et al. .............. | 310/218 |
| 2,467,586 A | * | 4/1949 | Gillen ......................... | 310/258 |
| 2,484,001 A | * | 10/1949 | Raymond .................... | 310/254 |
| 3,234,417 A | * | 2/1966 | Sommers et al. ............. | 310/89 |
| 3,445,693 A | * | 5/1969 | Crawshaw et al. ........... | 310/89 |
| 3,894,256 A | * | 7/1975 | Sholtz ......................... | 310/90 |
| 4,225,798 A | * | 9/1980 | Barrett ........................ | 310/218 |
| 4,433,472 A | * | 2/1984 | Andoh et al. ................. | 310/89 |
| 4,626,725 A | * | 12/1986 | Kawada et al. ............... | 310/89 |
| 4,796,352 A | * | 1/1989 | Kawada ....................... | 310/89 |
| 4,816,707 A | * | 3/1989 | Vanderlaan .................. | 310/254 |

FOREIGN PATENT DOCUMENTS

| | | | | |
|---|---|---|---|---|
| DE | 339614 | * | 7/1921 | ................. 310/258 |
| DE | 1201907 | * | 9/1965 | ................. 310/258 |
| DE | 2806971 | * | 8/1979 | ................. 310/257 |
| GB | 29562 | * | of 1913 | ................. 310/156 |
| GB | 17732 | * | 10/1991 | |
| GB | 17732 | * | 1/1992 | ................. 310/156 |

* cited by examiner

*Primary Examiner*—Burton S. Mullins
(74) *Attorney, Agent, or Firm*—Bacon & Thomas

(57) ABSTRACT

A closed magnetization circuit is formed by at least one half, of the casing which supports the rotor, the half-casing being in the form of a C-shape which provides an axial magnetization path between the individual poles of the motor, resulting in an open structure with reduced height and increased heat dissipation.

1 Claim, 1 Drawing Sheet

MOTOR HAVING CLOSED MAGNETIZATION CIRCUIT FORMED BY THE CASING WHICH HOLDS THE ROTATING SHAFT OF THE MOTOR

This application is a Continuation of application Ser. No. 08/189,755, filed Feb. 1, 1994 now abandoned.

SUMMARY OF THE INVENTION

The present invention relates to a motor, and in particular to a closed magnetization circuit formed by the casing which holds the rotating motor shaft at axially opposed sides of the rotor. This arrangement has the following advantages compared to traditional motors:

(1) the rotor can be exposed for better heat dissipation;
(2) the overall height of the motor can be reduced;
(3) the weight and cost of the motor can be reduced;
(4) the surface of the exposed rotor can directly form a driving element for certain applications.

DETAILED DESCRIPTION OF THE INVENTION

The present invention relates to a closed magnetization circuit formed by the end casing which holds the rotating shaft of a motor at axially opposed sides of the rotor. Use of the shaft support casing to provide an axial magnetization path is in place of traditional field magnetization paths which extend radially around the motor.

Figure 1:
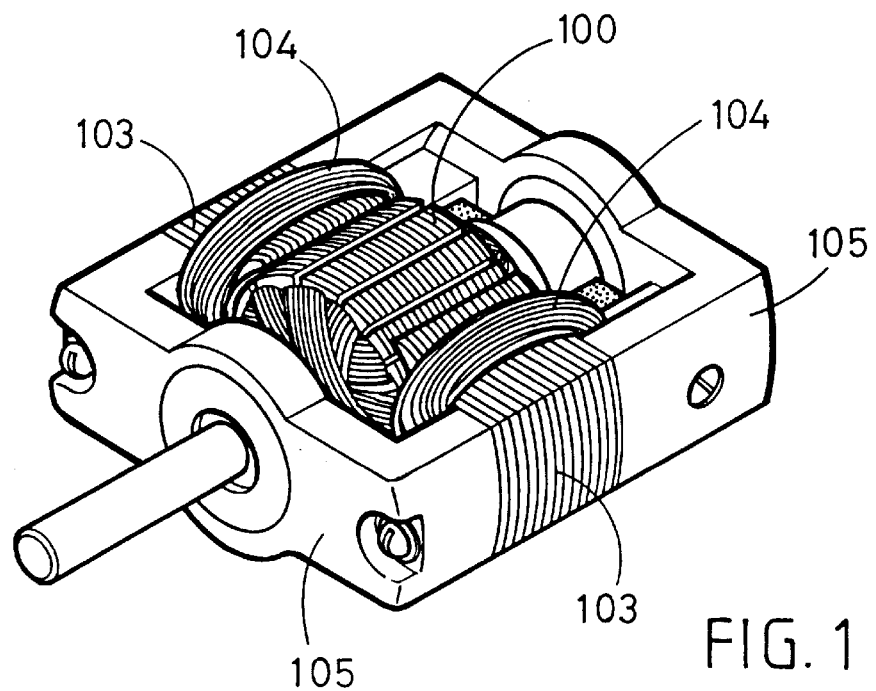
FIG. 1 is a diagram showing the construction of a motor having a closed magnetization circuit formed by the casing which holds the rotating motor shaft.
Figure 2:
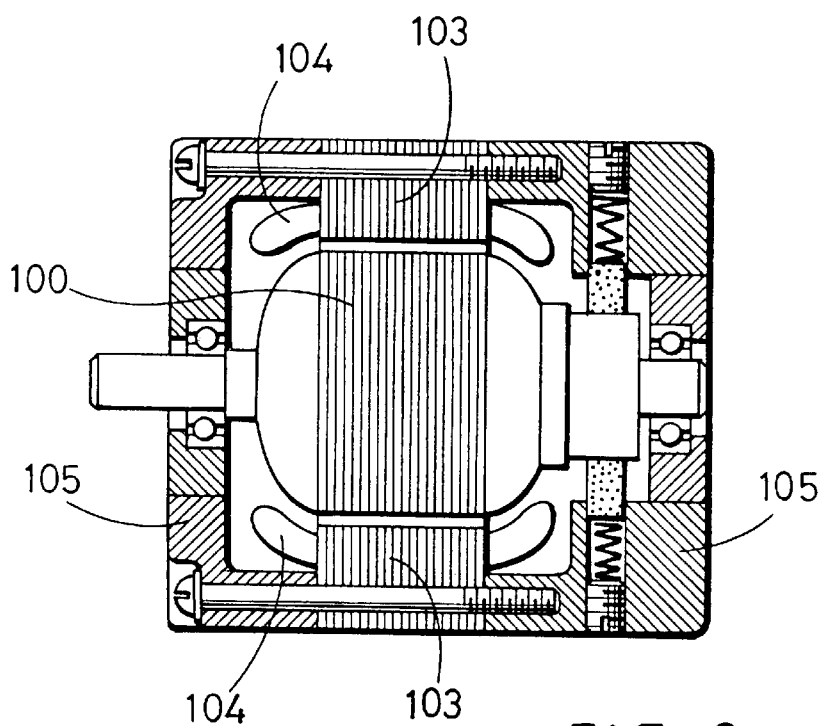
FIG. 2 is a side view of the motor of FIG. 1.

FIG. 1 is a diagram showing the construction of a magnetization circuit for a motor formed by the rotating shaft end casing of the motor, and FIG. 2 is a side view of the motor shown in FIG. 1. The illustrated motor includes a motor rotor 100, which may be any known type of rotor, including AC or DC brush or brushless permanent magnet type or winding type excitation rotors, with conductive ring or sheet type commutation, or a squirrel cage, disk, column, or conical type rotor, so long as the revolving surface of the rotor is capable of inductively coupling with an applied magnetic field.

The preferred motor also includes an individual field core 103, which may be made of a good magnetic inductive material having a field winding therearound or a permanent magnet (in the illustrated embodiment, a field winding 104 is shown for causing the core 103 to be electrically magnetized in order to magnetize the core and provide a magnetic field for causing the rotor to turn, although a permanent magnet would have the same effect.)

The path for forming a magnetic circuit includes an axial magnetic-inductive end casing 105 made of a good magnetic inductive material (having low whirl and magnetic stagnation losses in the case of AC application) which provides a return path for flux conducted between the poles formed by cores 103, and may be arranged in the following manner:

(1) both ends of the casing 105 may be made of a good magnetic inductive magnetic material (with low whirl and magnetic stagnation losses for AC application) with each magnetic pole formed by cores 103 secured to the casing from the side;

(2) one end of the motor casing may be made of a good magnetic inductive material with the poles secured to sides thereof while the other end of the casing may be made of non-inductive material;

(3) one end of the casing may have a C-shape, while the other end of the casing and a front casing are made of a good magnetic inductive material (with low whirl and magnetic stagnation losses in the case of AC application), and the individual magnetic poles are radially bonded or locked by a screw or securely retained with a side clamping force to the high permeability casing;

(4) one end casing of the motor may be a C-shape and be made of a good magnetic inductive material with low whirl and magnetic stagnation losses for AC application), the other end casing being made of non-inductive material, and with the individual magnetic poles radially bonded or locked by screws (as shown) or securely retained with a side clamping force;

(5) the motor end casing may be integrally molded from a good magnetic inductive material (with low whirl and magnetic stagnation losses for AC application) and have sides secured to the individual magnetic poles;

(6) both end casings of the motor may be made of a good magnetic inductive material (including low whirl and magnetic stagnation losses for AC application) and be made up of a symmetrical pair of C-shaped structures, with the individual magnetic poles securely retained by a side clamping force;

(7) the motor end casing may be made of a good magnetic inductive material (having low whirl and magnetic stagnation losses for AC application) and be made up of a pair of C-shaped structures.

Whenever the end casing is made of a good magnetic inductive material, either a cylindrical structure made of non-inductive material for isolating the magnetic flux in the case, or a motor revolving shaft made of non-inductive material for preventing magnetic flux from flowing to the motor shaft center, must be provided for the rotor spindle (or bearing).

The advantages of the present invention lie in omitting the magnetization for each individual magnetic pole, allowing the rotor to be exposed for easy ventilation. Where necessary, the exposed rotor may be directly connected to or itself form a drive element (as opposed to using a shaft as the drive element). In addition, the height of the motor located in the direction of the exposed rotor is reduced as a result of the reduced volume of the magnetization circuit structure, increasing flexibility of space selection. For certain fields, the exposed portion of the rotor may be sealed with a thin sheet of non-inductive material to protect it from dust pollution.

What is claimed is:

1. In a motor, comprising:

a rotor;

at least two magnetic poles made of a magnetically inductive material surrounded by a field winding and arranged to generate a magnetic field which, by interaction with the rotor, causes the rotor to rotate; and a casing consisting of two end casings made of a magnetically inductive material for holding said rotor at axially opposed ends of the rotor and for retaining said poles, said casing serving as a sole means of support for said poles and said rotor;

the improvement wherein each of said end casings is a C-shaped member made of a magnetically inductive material which forms a means for providing a respective axial magnetization path between said poles, one on each side of the poles, said respective axial magnetization paths being the only magnetization paths between said poles, wherein said two magnetic poles are clamped between ends of said end casings such that said poles extend transversely relative to said end casings, and wherein said C-shaped members thereby form a means for exposing the rotor in order to ventilate the rotor.

* * * * *